Oct. 31, 1939.                H. SINGER                2,178,500
                              SHAKER
                        Filed Jan. 5, 1939

Henry Singer,
INVENTOR

By Victor J. Evans & Co.
ATTORNEYS

Patented Oct. 31, 1939

2,178,500

UNITED STATES PATENT OFFICE 2,178,500

SHAKER

Henry Singer, Honolulu, Territory of Hawaii, assignor of one-half to Gerald W. Murphy, United States Army, Scofield Barracks, Territory of Hawaii Application January 5, 1939, Serial No. 249,506

8 Claims. (Cl. 259—72)

My invention relates to shakers and has as one of the principal objects thereof the provision of a shaker equipped with a removable inner receptacle provided with trays for accommodating certain ingredients necessary in the mixing of beverages to impart a flavor to the latter and said inner receptacle operable for removal from the shaker in a manner whereby the residue of said ingredients is removed therewith.

Another object of my invention is to provide a device of the character described which is simple in construction, durable in use, efficient in operation and economical in manufacture.

An important object of my invention is to provide a device of the character described so constructed and arranged whereby the parts thereof may be readily cleaned thus maximizing sanitation.

Other objects and advantages will be apparent from the following description, appended claims and annexed drawing..

Referring to the drawing wherein like reference characters designate like parts throughout the several views.

Figure 1:
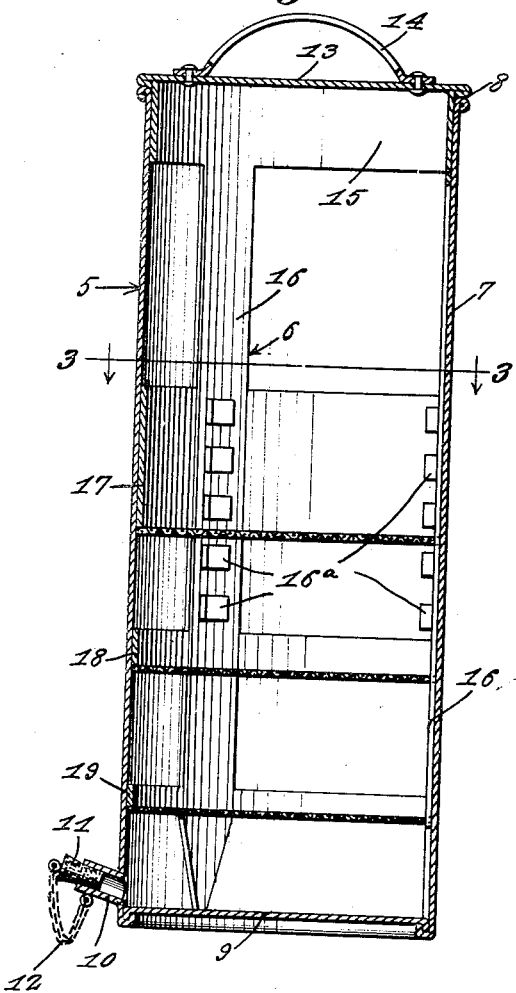
Figure 1 is a longitudinal sectional view of my invention.
Figure 2:
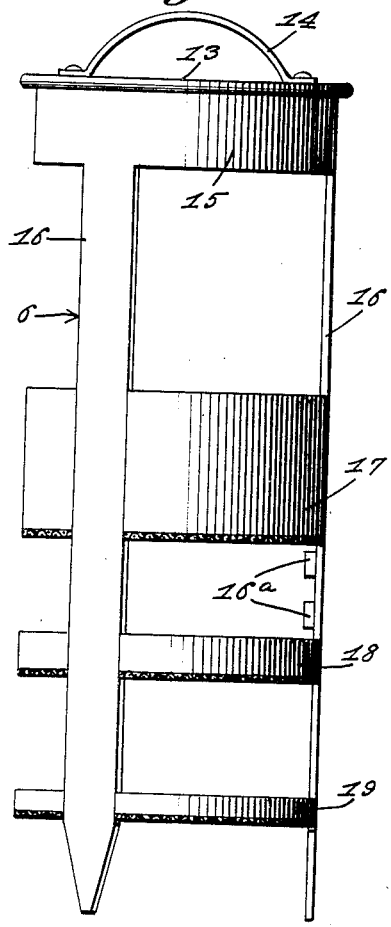
Figure 2 is a side elevation of the inner receptacle.
Figure 3:
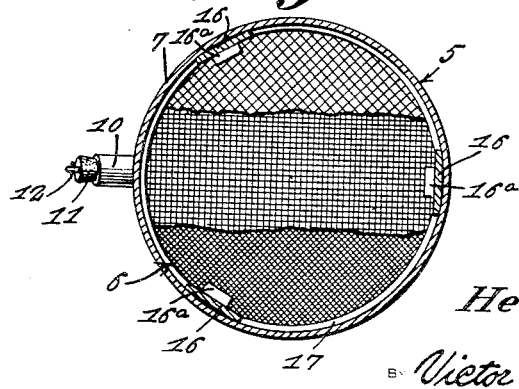
Figure 3 is a transverse sectional view taken on the line 3—3 of Figure 1.

In an embodiment of my invention I have chosen to herein describe and illustrate in the drawing, I construct my invention in the form of a cocktail shaker 5 comprising inner and outer receptacles 6 and 7 respectively. The outer receptacle 7 is of an elongated cylindrical configuration and provided with an open top having a circumferentially extending rib defining a mouth 8 and a closed bottom 9. The cylindrical wall of the receptacle 7 is fashioned, adjacent the bottom 9, with a drain spout 10 provided with a plug 11 effecting closure of said spout during the operation of said shaker. The plug is connected to the spout by a flexible element 12, for instance a chain, whereby to preclude loss thereof when removed from the spout.

The inner receptacle 6 comprises a flange cover 13 fitting within the mouth and provided on the outer face thereof with a handle 14 whereby said inner container may be readily removed from said outer container. The flange of the cover 15 is fashioned with a plurality of spaced posts 16 depending from the top and extending to points adjacent the bottom 9 of the outer receptacle and said posts are tapered at their lower end portions to a relatively narrow degree whereby to preclude one of said posts being disposed in front of the discharge port of the spout 9 and blocking the latter to prevent the passage of a mixed beverage therethrough.

The posts have mounted thereon and extending therebetween, at spaced intervals, a plurality of separating screens or perforated decks, said decks in the present instance being three in number and constituting upper, intermediate and lower decks 17, 18 and 19 respectively. The upper, intermediate and lower decks are constructed of relatively large, medium and fine mesh screens respectively and each of said decks are provided with solid side walls or flanges for retaining desired ingredients on said decks.

In use, solid or semi-solid mixing ingredients, for instance fruits or fruit pulps, are placed on the upper deck and a desired mixing liquid poured within the outer container. The inner container is then inserted within the outer container and the shaker thoroughly shaken in the usual manner whereby the liquid therein is thoroughly mixed with the ingredients and the juices of the latter strained through the upper, intermediate and lower decks. All of the decks may contain crushed ice and the like for cooling the beverage while being mixed and upon removal of the inner receptacle, the residue of said ingredients will be contained on the respective decks and thus removed from the outer receptacle. The beverage thus mixed therein may then be drained from the outer container through the medium of the spout 10 upon removal of the cork 11 therefrom.

The inner faces of the posts 16 are provided with a plurality of spaced projections or buttons 16a as clearly illustrated in the drawing which coact with the ingredients of the device to maximize breakage of the particles thereof during the mixing operation.

The outer receptacle may be constructed of glass as well as metal and when constructed of glass, the spout 10 is eliminated, the beverage being removed from said outer container by pouring the same through the mouth 8 thereof.

The agitation of the various ingredients for effecting a thorough mixing thereof is greatly increased by the action of the ingredients against the screened decks which have a far more shattering effect than merely whirling the mixture about in the usual rotary manner.

While I have shown and described the inner receptacle as constructed with a ternary of separating screens or decks, it is to be understood that any number may be used whereby to increase the effectiveness of the mixing operation.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation which are capable of extended application in advance forms, and that the invention comprehends all construction within the scope of the appended claims.

What I claim is:

1. A device of the character described, comprising, outer and inner receptacles, said outer receptacle fashioned with a closed bottom and an open top, said inner receptacle provided with a cover closing said top and fashioned with spaced depending posts terminating adjacent said bottom, and a plurality of spaced perforated decks arranged above said bottom and fixed to said posts said decks provided with upwardly extending side walls whereby ingredients on said decks are maintained thereon when said inner receptacle is removed from said outer receptacle.

2. A device of the character described, comprising, outer and inner receptacles, said outer receptacle fashioned with a closed bottom and an open top, said inner receptacle provided with a cover closing said top and fashioned with spaced depending posts terminating adjacent said bottom, and a plurality of spaced perforated decks arranged above said bottom and the perforations of each deck increasing in size towards said cover, said decks fixed to said posts and fashioned with upwardly extending side walls whereby ingredients on said decks are maintained on said decks when said inner receptacle is removed from said outer receptacle.

3. The elements of claim 1 as set forth and defined therein including, said outer receptacle provided with an outlet opening adjacent said bottom, said posts fashioned on the lower ends adjacent said bottom with tapered portions of a width materially less than the diameter of said outlet opening to preclude said posts from completely closing said opening.

4. The elements of claim 2 as set forth and defined therein including, said outer receptacle provided with an outlet opening adjacent said bottom, said posts fashioned on the lower ends adjacent said bottom with tapered portions of a width materially less than the diameter of said outlet opening to preclude said posts from completely closing said opening.

5. The elements of claim 1 as set forth and defined therein including, said posts provided with spaced inwardly extending projections coacting with some of said decks for maximizing breakage of the particles of said ingredients during mixing of the latter.

6. The elements of claim 2 as set forth and defined therein including, said posts provided with spaced inwardly extending projections coacting with some of said decks for maximizing breakage of the particles of said ingredients during mixing of the latter.

7. A device of the character described, comprising, outer and inner receptacles, said outer receptacle fashioned with a closed bottom and an open top, said inner receptacle provided with a cover closing said top and fashioned with spaced depending posts terminating adjacent said bottom, and a plurality of spaced perforated decks arranged above said bottom and fixed to said posts, said decks provided with upwardly extending side walls whereby ingredients on said decks are maintained thereon when said inner receptacle is removed from said outer receptacle, said outer receptacle provided with an outlet opening adjacent said bottom, said posts fashioned on the lower ends adjacent said bottom with tapered portions of a width materially less than the diameter of said outlet opening to preclude said posts from completely closing said opening, said posts provided with spaced inwardly extending projections coacting with some of said decks for maximizing breakage of the particles of said ingredients during mixing of the latter.

8. A device of the character described, comprising, outer and inner receptacles, said outer receptacle fashioned with a closed bottom and an open top, said inner receptacle provided with a cover closing said top and fashioned with spaced depending posts terminating adjacent said bottom, and a plurality of spaced perforated decks arranged above said bottom and the perforations of each deck increasing in size towards said cover, said decks fixed to said posts and fashioned with upwardly extending side walls whereby ingredients on said decks are maintained on said decks when said inner receptacle is removed from said outer receptacle, said outer receptacle provided with an outlet opening adjacent said bottom, said posts fashioned on the lower ends adjacent said bottom with tapered portions of a width materially less than the diameter of said outlet opening to preclude said posts from completely closing said opening, said posts provided with spaced inwardly extending projections coacting with some of said decks for maximizing breakage of the particles of said ingredients during mixing of the latter.

HENRY SINGER.